US012491596B2

(12) United States Patent
Seichter et al.

(10) Patent No.: US 12,491,596 B2
(45) Date of Patent: Dec. 9, 2025

(54) DEVICE AND METHOD FOR DETECTING AN APPROACH OF A TOOL TO A WORKPIECE

(71) Applicant: DR. JOHANNES HEIDENHAIN GmbH, Traunreut (DE)

(72) Inventors: Martin Seichter, Wonneberg (DE); Andreas Lahner-Prinz, Burghausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 372 days.

(21) Appl. No.: 18/126,540

(22) Filed: Mar. 27, 2023

(65) Prior Publication Data

US 2023/0311263 A1 Oct. 5, 2023

(30) Foreign Application Priority Data

Mar. 29, 2022 (DE) .......................... 102022203088.5

(51) Int. Cl.
*B23Q 15/22* (2006.01)
*B23Q 11/12* (2006.01)
*G05B 19/402* (2006.01)

(52) U.S. Cl.
CPC ............ *B23Q 15/22* (2013.01); *B23Q 11/126* (2013.01); *G05B 19/402* (2013.01)

(58) Field of Classification Search
CPC ................ B23Q 17/2233; B23Q 15/22; B23Q 17/2241; B23Q 2717/00; B23Q 17/225;

(Continued)

(56) References Cited

U.S. PATENT DOCUMENTS 4,808,048 A * 2/1989 Miller .................. G05B 19/404
  408/13
5,595,462 A * 1/1997 Hensley ............... B23Q 1/0036
  408/1 R (Continued)

FOREIGN PATENT DOCUMENTS

DE         10127972 C1    7/2002
DE      102010032599 A1    2/2011

(Continued)

OTHER PUBLICATIONS

European Search Report issued in corresponding EP Patent Application No. 23151093.4, dated Jul. 24, 2023, pp. 1-2.

*Primary Examiner* — Peter J Macchiarolo
(74) *Attorney, Agent, or Firm* — Carter, DeLuca & Farrell LLP

(57) ABSTRACT

A device for determining an approach of a tool to a workpiece in a machine tool with internal cooling supply includes a measuring arrangement, having a measuring graduation arranged in a rotationally fixed manner on a shaft and at least one position sensor arranged in a fixed manner relative to the shaft, and a data processor. The position sensor is adapted to scan the measuring graduation and to generate position values therefrom that indicate a position of the shaft. The position values are fed to the data processor, which, by evaluating a progression of the position values when the tool approaches the workpiece, determines that the tool is located in an approach area relative to the workpiece, and signals, by an approach signal, when the tool reaches an approach position relative to the workpiece, in which the tool is close to the workpiece without touching it.

21 Claims, 9 Drawing Sheets

(58) Field of Classification Search
CPC .............. B23Q 11/10; B23Q 17/0914; B23Q 17/2428; B23Q 2716/00; B23Q 17/2447; G05B 19/402; G05B 19/404; G05B 19/401; G05B 2219/37405; B23B 25/06; B23B 2270/48; G01B 11/026
USPC ...................... 700/193, 190; 408/13; 33/626
See application file for complete search history.

(56) References Cited

U.S. PATENT DOCUMENTS

| | | | | |
|---|---|---|---|---|
| 6,167,634 | B1* | 1/2001 | Pahk .................... | G01B 5/0014 33/503 |
| 6,269,284 | B1* | 7/2001 | Lau ...................... | G01B 21/042 700/56 |
| 6,425,715 | B1* | 7/2002 | Sasanecki .......... | B23Q 11/1084 408/56 |
| 8,924,003 | B2* | 12/2014 | Maekawa ............ | G05B 19/404 700/193 |
| 9,869,992 | B2* | 1/2018 | Takeno ................ | G05B 19/404 |
| 9,945,799 | B2* | 4/2018 | Koyama .............. | G01M 99/002 |
| 11,435,717 | B2 | 9/2022 | Mitterreiter | |
| 11,484,982 | B2* | 11/2022 | Liu ..................... | B23Q 11/0007 |
| 11,519,764 | B2* | 12/2022 | Gustafsson .............. | G01D 5/04 |
| 11,650,565 | B2* | 5/2023 | Watanabe ............ | G05B 19/404 700/173 |
| 12,098,919 | B2* | 9/2024 | Joachimsthaler .. | B23Q 17/2241 |
| 2002/0053903 | A1* | 5/2002 | Kempe ................. | G01D 5/145 324/207.2 |
| 2010/0299094 | A1* | 11/2010 | Hsu ....................... | G01B 5/0014 702/95 |
| 2014/0111191 | A1* | 4/2014 | Andre .................... | G01D 5/145 324/207.13 |
| 2015/0276633 | A1* | 10/2015 | Koyama ............. | G01M 99/002 702/94 |
| 2022/0074740 | A1 | 3/2022 | Joachimsthaler | |

FOREIGN PATENT DOCUMENTS

| | | |
|---|---|---|
| EP | 3591344 A1 | 1/2020 |
| EP | 3964903 A1 | 3/2022 |

* cited by examiner

DEVICE AND METHOD FOR DETECTING AN APPROACH OF A TOOL TO A WORKPIECE

CROSS-REFERENCE TO RELATED APPLICATIONS

The present application claims priority to Application No. 10 2022 203 088.5, filed in the Federal Republic of Germany on Mar. 29, 2022, which is expressly incorporated herein in its entirety by reference thereto.

FIELD OF THE INVENTION

The present invention relates to devices and methods for determining an approach of a tool to a workpiece in a machine tool. The devices and methods described herein may be utilized in numerically controlled machine tools that form workpieces by cutting machining, e.g., by milling, turning, and/or grinding.

BACKGROUND INFORMATION

Widely used manufacturing methods for mechanical workpieces are based on machining, i.e., the cutting of material. Material is selectively removed from a blank using tools to ultimately create a product with the desired form and function. To remove material, the workpiece is brought into contact with a tool. The tools have geometrically defined or undefined cutting edges. Examples of tools with geometrically defined cutting edges are milling cutters, drills, and turning tools, while an example of a tool with undefined cutting edges is a grinding wheel. For the cutting process, one of the objects-tool or workpiece—is often set in rotation before it is brought into contact with the other object.

The machining may be controlled by a computer, which, while executing a manufacturing program, drives electric drives to move at least one of the objects. Position measuring devices-rotary encoders or linear encoders—are provided to determine the actual position of the moving object, and their measured values are, in turn, fed to the computer. The computer is referred to as a CNC controller, and the machine tool used to perform the machining is referred to as a CNC machine.

A spindle is provided to generate the rotation of the object. This is an electric motor that drives-directly or indirectly—a shaft to which, in turn, the object is attached. A rotary encoder is provided to measure the angle of rotation and/or speed of the spindle. Furthermore, measuring devices can measure displacements of the shaft from an ideal position. European Patent Document No. 3 591 344 and U.S. Patent Application Publication No. 2020/0012256 describe such a measuring device.

Clamping devices are provided to fix the workpiece for the purpose of machining. Since the clamping of a new workpiece (e.g., a blank) is subject to large tolerances and the dimensions of the blanks can also vary, the exact position of the newly clamped blank, as well as its dimensions, must be determined before machining begins. For this purpose, probes are used, which are moved in the direction of the workpiece instead of a tool and emit a switching signal when they come into contact with the workpiece. The CNC control evaluates the switching signal and determines the position and dimensions of the workpiece by approaching several positions on the blank (e.g., probing). Only after the probing can the actual machining begin.

A disadvantage of this procedure is the time required, since the tool must first be exchanged for the probe and exchanged back again after the measuring process.

SUMMARY

Example embodiments of the present invention provide a device for determining the position of a workpiece in a machine tool.

According to example embodiments, a device is provided for determining an approach of a tool to a workpiece in a machine tool. The tool and the workpiece are movable relative to one another, and the tool or the workpiece is connected to a shaft in a rotationally fixed manner. The tool includes a coolant channel through which a coolant can be supplied to a machining area in which machining of the workpiece by the tool is performed. The device includes a measurement arrangement having a measuring graduation arranged in a rotationally fixed manner on the shaft and at least one position sensor arranged in a fixed manner relative to the shaft, and a data processor, e.g., including electronic circuitry. The position sensor is adapted to scan the measuring graduation and to generate position values therefrom that indicate a position of the shaft. The position values are fed to the data processor, which, by evaluating a progression of the position values when the tool approaches the workpiece, determines that the tool is located in an approach area relative to the workpiece, in which a displacement of the shaft occurs resulting from the dynamic pressure of the coolant flow impinging on the workpiece, and signals, by an approach signal, when the tool reaches an approach position relative to the workpiece in which the tool is close to the workpiece without touching it.

Example embodiments of the present invention provide a method for determining the position of a workpiece in a machine tool.

According to an example embodiment of the present invention, a method is provided for determining an approach of a tool to a workpiece in a machine tool. The tool and the workpiece are movable relative to one another, and the tool or the workpiece is connected to a shaft in a rotationally fixed manner. The tool includes a coolant channel through which a coolant can be supplied to a machining area in which machining of the workpiece by the tool is performed. The machine tool includes a measurement arrangement having a measuring graduation arranged in a rotationally fixed manner on the shaft and at least one position sensor arranged in a fixed manner relative to the shaft, and a data processor. In the method, the measuring graduation is scanned by the position sensor, and position values are generated therefrom that indicate a position of the shaft. The position values are fed to the data processor, which, by evaluating a progression of the position values when the tool approaches the workpiece, determines that the tool is located in an approach area relative to the workpiece, in which a displacement of the shaft occurs, that results from the dynamic pressure of the coolant flow impinging on the workpiece, and signals, by an approach signal, when the tool reaches an approach position relative to the workpiece, in which the tool is close to the workpiece without touching it.

The measuring graduation has a graduation track whose code elements are arranged in the circumferential direction of the shaft and whose scanning by the position sensors makes it possible to measure position values indicating the angular position of the shaft. For example, three position sensors are provided for scanning the graduation track and are evenly spaced in the circumferential direction of the shaft. A deflection of the shaft influences, depending on the direction of the deflection, the angular positions measured by the position sensors, which has the effect of changing the angular difference determined by the arrangement of the position sensors. From this, in turn, the magnitude and direction of the deflection of the shaft can be determined.

In addition to the foregoing graduation track, the measuring graduation may have a second graduation track having code elements arranged in an annular manner around the circumference of the shaft. To scan these, three position sensors may be provided, which are also arranged at uniform intervals in the circumferential direction of the shaft. Scanning the second measuring graduation allows for measuring deflections of the shaft in its axial direction. For example, a rotation of the axis in the axial direction, i.e., a tilted position of the axis relative to a resting position of the shaft, can be measured, which rotation has the effect of tilting the annular code elements relative to the position sensors.

The position values of the position sensors are fed into a displacement processor in the data processor, which continuously generates at least one displacement value that is a measure of the deflection of the shaft caused by a force acting on the shaft. The data processor evaluates the progression or trend of the displacement values.

For example, the data processor includes a comparator adapted to determine the reaching of the approach position by comparing currently arriving displacement values with a threshold value.

As another example, the data processor includes a differentiator, adapted to form the difference quotient from successively arriving displacement values and the time interval of their arrival, and a comparator, adapted to determine the reaching of the approach position by comparing the difference quotients with previously stored threshold values.

As a further example, the data processor includes a frequency analyzer adapted to evaluate the progression or trend of the displacement values in the frequency domain. By selectively monitoring the power spectral density of frequency bands determined by the rotational speed of the shaft and the number of coolant openings in the tool, it is possible to infer when the approach position has been reached.

For example, the position values of at least one position sensor may also be fed directly to the frequency analyzer, thus eliminating the need for the displacement processor.

As an additional example, the data processor includes an AI module that evaluates the progression or trend of the displacement values using artificial intelligence methods, e.g., by pattern recognition. This may be particularly beneficial when the displacement values have large statistical variations. The position values of at least one position sensor may be fed directly to the AI module, so that no displacement processor is required.

In order to allow the data processor to interact with other components, for example, a control unit of the machine tool, the data processor may include a command channel via which commands and, if applicable, data can be fed to the data processor, e.g., a start command which starts the method.

The command channel together with the response data channel may be arranged as a digital, e.g., serial, interface.

For the determination of threshold values, a threshold value determination device may be provided, which, when the tool approaches the workpiece, detects a transition from the approach area to a machining area in which machining of the workpiece is performed and determines a threshold value therefrom. Threshold values may be determined in a test execution with a test workpiece. The test execution may be started by the control unit by transmitting a test start command to the data processor.

The threshold values may be stored in the data processor, for example, in the comparator, the frequency analyzer, or the AI module.

Further features and aspects of example embodiments of the present invention are described in more detail below with reference to the appended schematic Figures.

DETAILED DESCRIPTION

Figure 1:
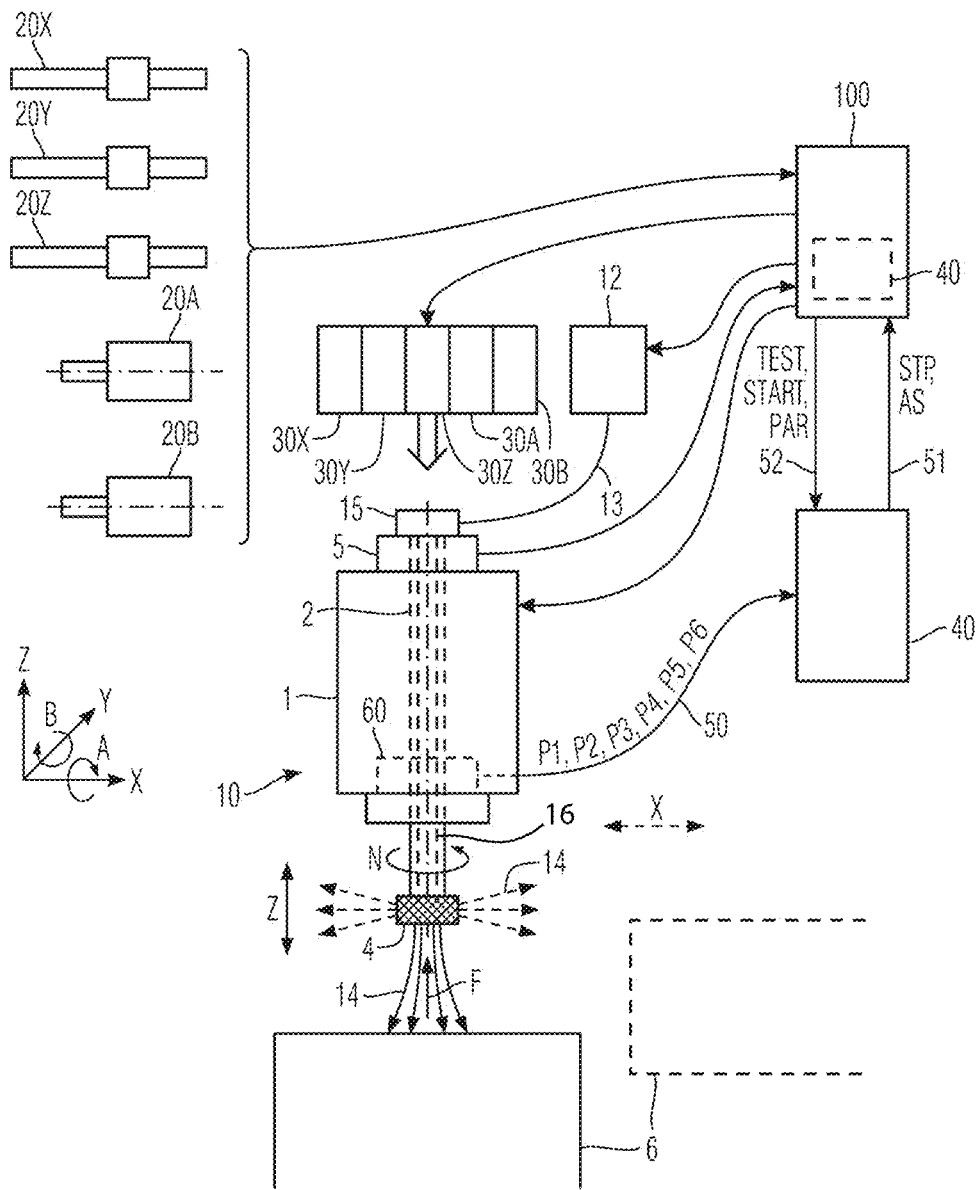
FIG. 1 illustrates a device according to an example embodiment of the present invention in relation to components of a machine tool.

FIG. 1 illustrates a device according to an example embodiment of the present invention in relation to components of a machine tool, e.g., a 5-axis milling machine. The machine tool includes a motor spindle 10, a drive, and a position measuring device for each axis of movement. A control unit 100 is provided for controlling motion sequences, e.g., for machining a workpiece 6.

The motor spindle 10 includes a spindle motor 1 and a shaft 2. At one end of the shaft 2, a tool 4 (e.g., a milling tool) is connected to the shaft 2 in a rotationally fixed manner so that it rotates therewith. A tool holder, e.g., a hollow shank taper, is provided for fastening the tool 4 to the shaft 2. An angle measurement device 5 (e.g., rotary encoder) is also mechanically coupled to the shaft 2. The coupling is provided by a mechanical coupling, which connects a rotatable shaft of the angle measurement device 5 to the shaft 2. In this manner, the angle position and/or number of completed revolutions of the shaft 2 can be measured with the angle measurement device 5. The shaft 2 is supported in the housing of the spindle motor 1 by roller bearings, for example.

To machine the workpiece 6, the shaft 2 of the spindle motor 1 is set in rotation and rotates at a speed N. The angle position measured by the angle measurement device 5 is used to control the speed. The tool 4 is brought into contact with the workpiece 6 by a relative movement of the motor spindle 10 with respect to the workpiece 6. For example, in a milling operation, the desired contour is milled from the workpiece 6. The relative movement may take place along linear drive axes X, Y, Z. In addition, swivel axes A, B, may also be provided, so that in the illustrated example, movement in five movement axes (e.g., degrees of freedom) X, Y, Z, A, B is possible. The movement of the individual axes is controlled by drives 30X, 30Y, 30Z, 30A, 30B, which drive corresponding mechanical components. Further position measurement devices 20x, 20Y, 20Z, 20A, 20B are provided in the machine tool for determining the position of the respective axes of movement X, Y, Z, A, B.

It should be appreciated that movement of the axes involves relative movements, e.g., a drive may move the motor spindle 10 and thus the tool 4, or may move the workpiece 6.

Likewise, it should be appreciated that the workpiece, instead of the tool may be fixed to the shaft in a rotationally fixed manner and may rotate with the shaft. For example, the machine tool may be arranged as a lathe, a grinding machine, etc.

The motor spindle 10 includes an internal cooling supply. In this regard, a coolant pump 12 is provided in the machine tool, which supplies a coolant 14 to the motor spindle 10 via a coolant line 13. A coolant coupler 15 is arranged on the shaft 2, via which the coolant 14 flows into a coolant channel 16. The coolant 14 flows through the shaft 2 via the tool holder and the tool 4 to the machining area. The machining area is the area of the machine tool in which the machining, e.g., cutting, of the workpiece 6 is performed. The coolant 14 is supplied at high pressure and serves to cool the machining area, e.g., the cutting edges of the tool 4. Depending on the machining, the cutting edges are defined (e.g., milling) or undefined (e.g. grinding).

When the coolant 14 impinges on the workpiece 6, dynamic pressure generates a force F that acts on the tool 4 and thus on the shaft 2 of the motor spindle 10. This force F is greater the closer the tool 4 is to the workpiece 6. The direction of the force F depends on the angle of impingement of the coolant 14 on the workpiece 6, the geometry of the workpiece, the speed N of the shaft 2, the geometry of the tool 4, etc. Thus, the force F may include components acting in the axial direction of the shaft 2 and components acting perpendicularly thereto.

In the illustrated example, the tool 4 is a substantially cylindrically shaped grinding tool, in which machining is performed by the end face of the tool 4. Accordingly, the coolant 14 also exits at the end face in the direction of movement Z toward the workpiece 6. However, the particular type or geometry of the tool should not be considered limiting. For example, tools with internal cooling supply may be provided, in which machining is performed by cutting edges arranged on the lateral surface, e.g., as milling tools. In this regard, the coolant 14 exits through corresponding openings (e.g., nozzles) in the lateral surface of the tool, as indicated by dashed lines in FIG. 1. In order to achieve a constant coolant supply, several coolant openings may be arranged around the circumference, e.g., one opening for each cutting edge of a milling cutter.

The control of such a machine tool is performed using program control from a control unit 100. The control unit 100 includes, for example, a computer that executes an operating system and corresponding programs. The computer includes peripherals, e.g., a monitor, input devices, memory, etc. The control unit 100 may be arranged as a numerical controller.

Measured values from the position measurement devices 20X, 20Y, 20Z, 20A, 20B and the angle measurement device 5 are fed to the control unit 100 via signal transmission channels. Suitable signal transmission channels are also provided for controlling drives 30X, 30Y, 30Z, 30A, 30B and the spindle motor 1 by the control unit 100. The signal transmission channels may be adapted to transmit analog or digital signals, depending on the requirements. For example, the signal transmission channels may include digital data interfaces, e.g., serial data interfaces.

The coolant pump 12 is also controlled by the control unit 100.

The machine tool includes a device, which includes a data processor 40 and a measurement arrangement 60.

The measurement arrangement 60 is adapted to determine displacements (e.g., deflections) of the shaft 2. Displacements occur whenever a force acts directly or indirectly on the shaft 2, for example, during machining of the workpiece 6 by the tool 4, or, as described above, when the tool 4, through which coolant flows, approaches the workpiece 6.

The measurement arrangement 60 is provided on the shaft 2. Displacements (e.g., deflections) of the shaft 2 can be determined by generating with at least one position sensor, which is arranged stationary relative to the shaft 2, position values that indicate a position of the shaft 2 by scanning at least one measuring graduation arranged over the circumference of the shaft 2 and rotatable therewith. Since displacements of the shaft 2 cause changes in the position values, conclusions can be made about the displacement of the shaft 2 by evaluating the generated position values.

Since the effect of a deflection of the shaft 2 on the position values depends on the direction from which a force acts on the shaft, several position sensors may be provided, e.g., two or three position sensors arranged offset in the circumferential direction of the shaft 2. If two position sensors are present, they may be arranged at an angular distance of 180°, and, in the case of three position sensors, an even distribution over the circumference of the shaft 2, i.e., an angular distance of 120° between each position sensor, may be provided.

Figure 2:
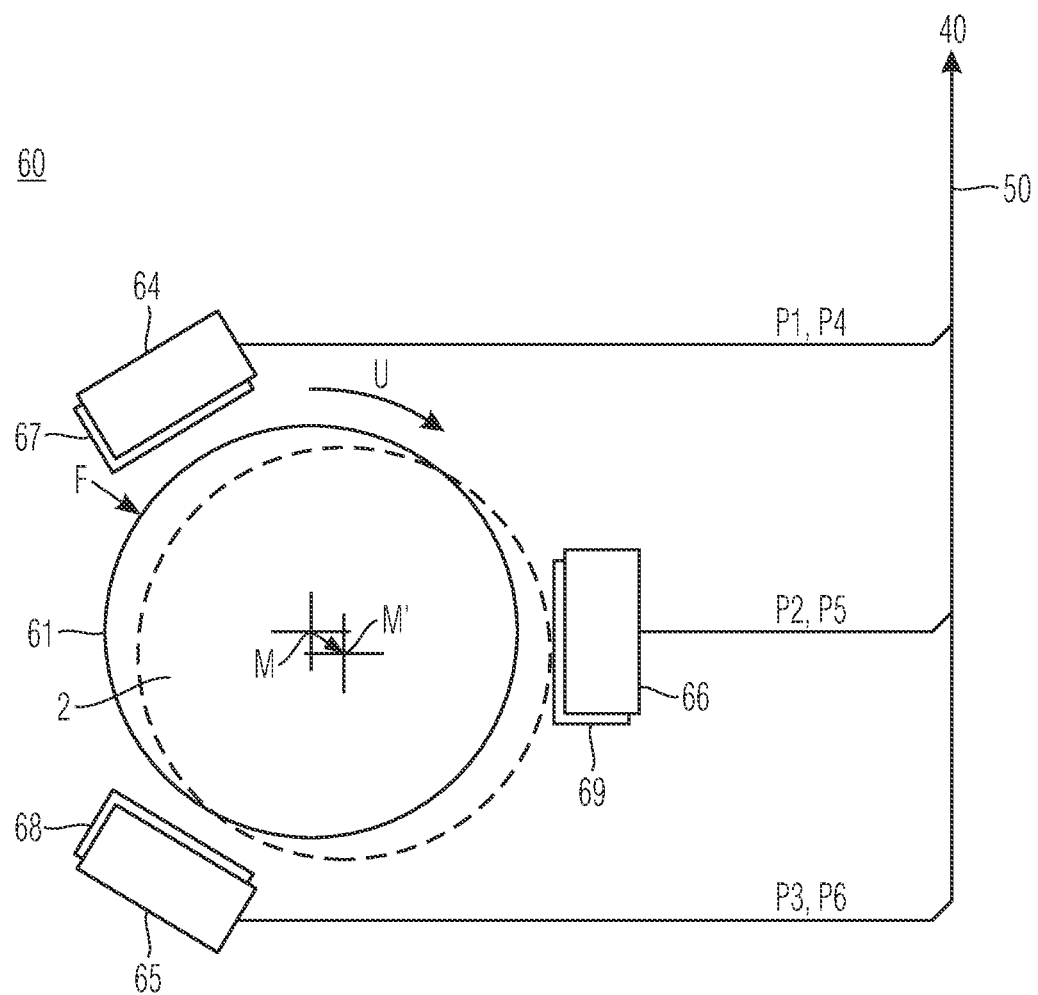
FIG. 2 illustrates a measurement arrangement.
Figure 3:
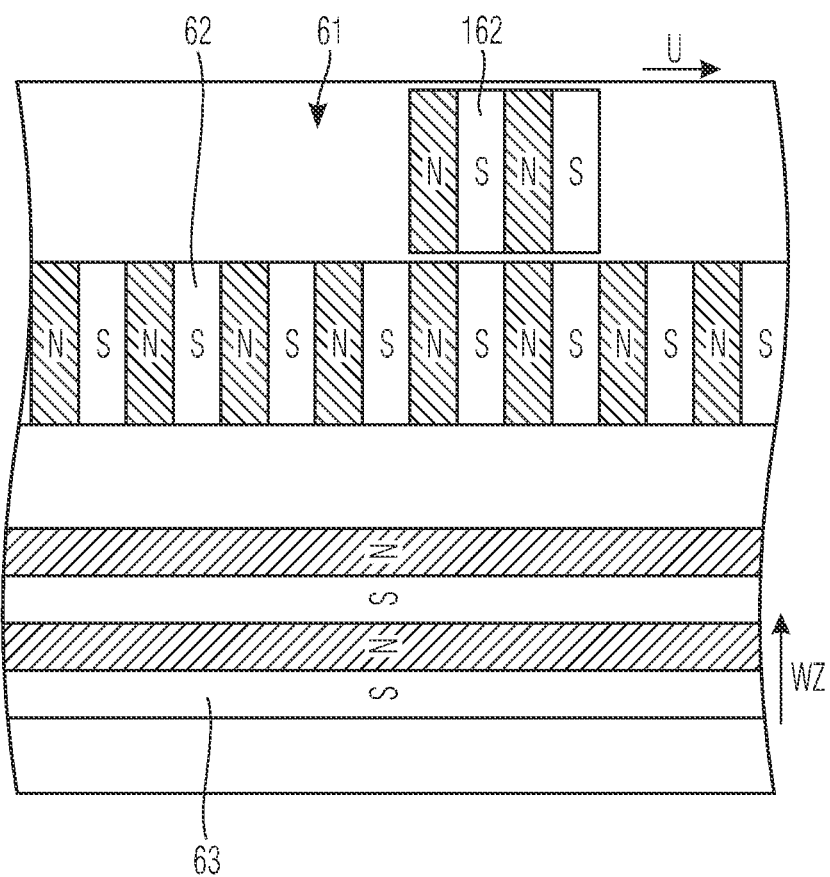
FIG. 3 illustrates a measuring graduation adapted for use in connection with the measurement arrangement illustrated in FIG. 2.

FIGS. 2 and 3 further describe a measurement arrangement.

The measurement arrangement 60 may be configured as described, for example, in European Patent Document No. 3 591 344 and U.S. Patent Application Publication No. 2020/0012256, each of which is expressly incorporated herein in its entirety by reference thereto.

For example, a measurement arrangement 60 includes six position sensors generating position values P1, P2, P3, P4, P5, P6.

The position values P1, P2, P3, P4 P5, P6 of the measurement arrangement 60 are fed to the data processor 40 for evaluation via a signal transmission channel 50. It should be appreciated that a position value describes any type of signal representing a position of the shaft 2. Position values may therefore be analog or digital signals. The processing of the position values in the data processor 40 is digital. Digitization or conversion into digital data words may be performed in the position sensors, in the data processor, etc. Thus, the transmission of the position values P1, P2, P3, P4 P5, P6 to the data processor can be analog or digital. The position sensors may generate digital position values P1, P2, P3, P4 P5, P6 and these digital data words may be transmitted via digital interfaces, e.g., serial interfaces.

The data processor 40 is adapted to evaluate the progression or trend of the position values P1, P2, P3, P4 P5, P6 arriving from the measurement arrangement 60, to determine displacements of the shaft 2 and evaluate them with respect to an approach of the tool 4 to the workpiece 6. The result of the evaluation is signaled by an approach signal AS, which is output to the control unit 100, for example, via an output data channel 51.

For example, operations of the data processor 40 are controllable, for example, by commands arriving via a command channel 52 from an external unit, e.g., from the control unit 100. For example, the operation of the data processor 40 may be started by a start command START.

Furthermore, it may be provided that the data processor 40 is fed parameters PAR via the command channel 52, e.g., the speed of the shaft 2, parameters of the internal cooling supply, the feed rate of the motor spindle 10, or information about the tool 4 (type, diameter, number of cutting edges, etc.), to evaluate the position values P1, P2, P3, P4 P5, P6.

The data processor 40 may be arranged as a stand-alone device, as a module arranged within the control device 100, as indicated in dashed lines, etc. Modules performing the operations of the data processor 40 may be provided, partially or completely, as a computer program, e.g., a set of instructions stored on or in a non-volatile computer-readable storage medium, for example, executable by a computer (PC) that includes the control unit 100 or by the data processor 40 itself. This applies to all examples of data processors described herein.

The output data channel 51 and the command channel 52 may be arranged jointly as a bidirectional interface, e.g., as a serial interface.

FIG. 2 illustrates an example of a measurement arrangement 60, which includes a measuring graduation 61 with two graduation tracks, and a total of six position sensors 64, 65, 66, 67, 68, 69.

The measuring graduation 61 is arranged on the shaft 2 in a rotationally fixed manner so that it rotates therewith. Code elements forming the measuring graduation 61 can be arranged directly on the shaft 2, for example by magnetization if a magnetic scanning principle is used, or by forming reflective and non-reflective areas if an optical scanning principle is used. Alternatively, the measuring graduation 61 can be arranged on a graduation carrier, which in turn is connected to the shaft 2 in a rotationally fixed manner.

FIG. 3 illustrates a measuring graduation 61 with two graduation tracks 62, 63. The first graduation track 62 serves to measure the angle, i.e., to determine the angle of rotation of the shaft 2, and to determine a displacement of the shaft 2 perpendicular to the direction of the axis. This corresponds to a displacement of the measuring graduation 61 in the drawing plane of FIG. 2. The second graduation track 62 is used to detect displacements of the shaft 2 in the axial direction.

The code elements of the first graduation track 62 are arranged one behind the other in the circumferential direction U of the shaft 2. In the illustrated example, the first graduation track 62 is arranged as an incremental graduation track and, for example, is based on a magnetic scanning principle, i.e., the graduation track includes a regular sequence of magnetic plus and minus (magnetic north and south) poles arranged in the circumferential direction U of the shaft 2. The measuring graduation 61 may additionally have a reference track 162, with which a reference position for the relative angular measurement of the incremental graduation track is established at a defined angular position by a short sequence of magnetic plus and minus (magnetic north and south) poles (e.g., a reference mark). In this manner, an absolute angle measurement is made possible. Instead of the reference track 162, the reference mark may be integrated in the graduation track 62.

Alternatively, the first graduation track 62 may be digitally encoded so that absolute angle measurement is possible, even without reference track 162. For example, the code elements of the first graduation track 62 are arranged in the form of a sequential pseudo-random code (PRC).

The code elements of the second graduation track 63 are arranged in an annular manner around the circumference of the shaft 2. Measuring the position or position changes of these code elements allows conclusions to be made both about displacements of the shaft 2 in its axial direction WZ and about rotations of the shaft 2 transverse to the axial direction (i.e., tilts out of the drawing plane of FIG. 2).

In the example illustrated in FIG. 2, a first group of position sensors 64, 65, 66 is provided for scanning the graduation track 62 and, if applicable, the reference track 162, as well as a second group of position sensors 67, 68, 69 for scanning the second graduation track 63. The position sensors of the two groups are each arranged at regular angular distances in the circumferential direction of the shaft 2, e.g., at an angular distance of 120°.

By scanning the graduation track 62 with the position sensors 64, 65, 66, the angular position of the shaft 2 can be measured. If a force F acts on the shaft 2, it is deflected, e.g., the center of rotation M is shifted (in FIG. 2 the shifted center of rotation is designated by M'). As indicated by the dashed circle, when the shaft 2 shifts, the measuring graduation 61 shifts as well. This affects the angle measurement of the first group of position sensors 64, 65, 66, so that by evaluating the progression or trend of the position values P1, P2, P3 of individual position sensors 64, 65, 66 or/and the change in the angular difference between the position values P1, P2, P3 of the position sensors 64, 65, 66, conclusions can be made about the magnitude and, if applicable, the direction of the force F acting on the shaft 2.

If the force F causes not only the shift of the shaft 2 (and thus of the graduation track 62) perpendicular to the axis direction (measurable with the first group of position sensors 64, 65, 66 by scanning the graduation track 62) but also a tilting of the shaft 2, i.e., a rotation transverse to the axis direction, this can be measured with the second group of position sensors 67, 68, 69 by scanning the second graduation track 63.

The illustrated arrangement of the second group of position sensors 67, 68, 69 for scanning the second graduation track 162 is considered to be particularly advantageous, since by evaluating the three position values P4, P5, P6 pure movements of the shaft 2 in the axis direction WZ and tilts of the shaft 2 can be clearly distinguished and thus evaluated separately from each other. If, for example, only movements (e.g., displacements) of the shaft 2 in the axis direction WZ are to be detected, even one of the position sensors 67, 68, 69, arranged at any point on the circumference, is sufficient for this purpose.

Forces F acting on the shaft 2 often cause displacements both perpendicular to the axis direction, detectable with the first group of position sensors 64, 65, 66, as well as tilts (e.g., rotations of the circle illustrated in FIG. 2 out of the drawing sheet plane), detectable with the second group of position sensors 67, 68, 69. Thus, processing of the position values P1, P2, P3, P4, P5, P6 measured by the six position sensors 64, 65, 66, 67, 68, 69 allows comprehensive determination of complex displacements of the shaft 2 caused by the force F acting on the shaft 2.

The position values P1, P2, P3, P4, P5, P6 generated by the position sensors 64, 65, 66, 67, 68, 69 may be fed to the data processor 40 for evaluation via the signal transmission channel 50.

Figure 4:
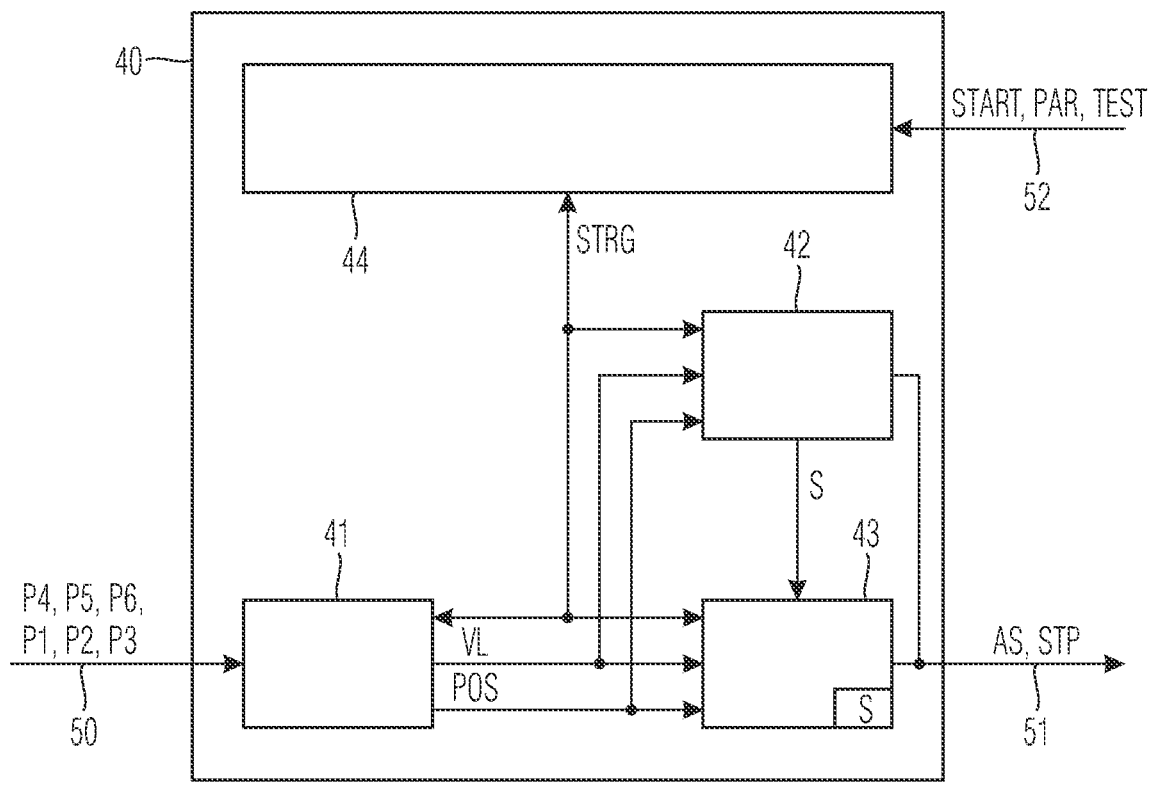
FIG. 4 illustrates a data processor.

FIG. 4 illustrates a data processor 40. The data processor 40 includes a displacement processor 41, a comparator 43, and a sequence controller 44.

The displacement processor 41 is adapted to continuously determine displacement values VL from the arriving position values P1, P2, P3, P4, P5, P6 during operation, indicating the amount of deflection of the shaft 2 from a resting position, and to output them to the comparator 43. For example, the displacement values VL are formed at constant time intervals. These are selected such that at least one displacement value VL is generated per revolution of the shaft 2, for example, by forming an average value of the displacement of the shaft 2 within one revolution.

As mentioned above, the generation of the displacement values VL may be based on the evaluation of the progression or trend of individual position values P1, P2, P3, P4, P5, P6 or/and the evaluation of the difference of the position values P1, P2, P3, P4, P5, P6 of several position sensors 64, 65, 66, 67, 68, 69.

Figure 5:
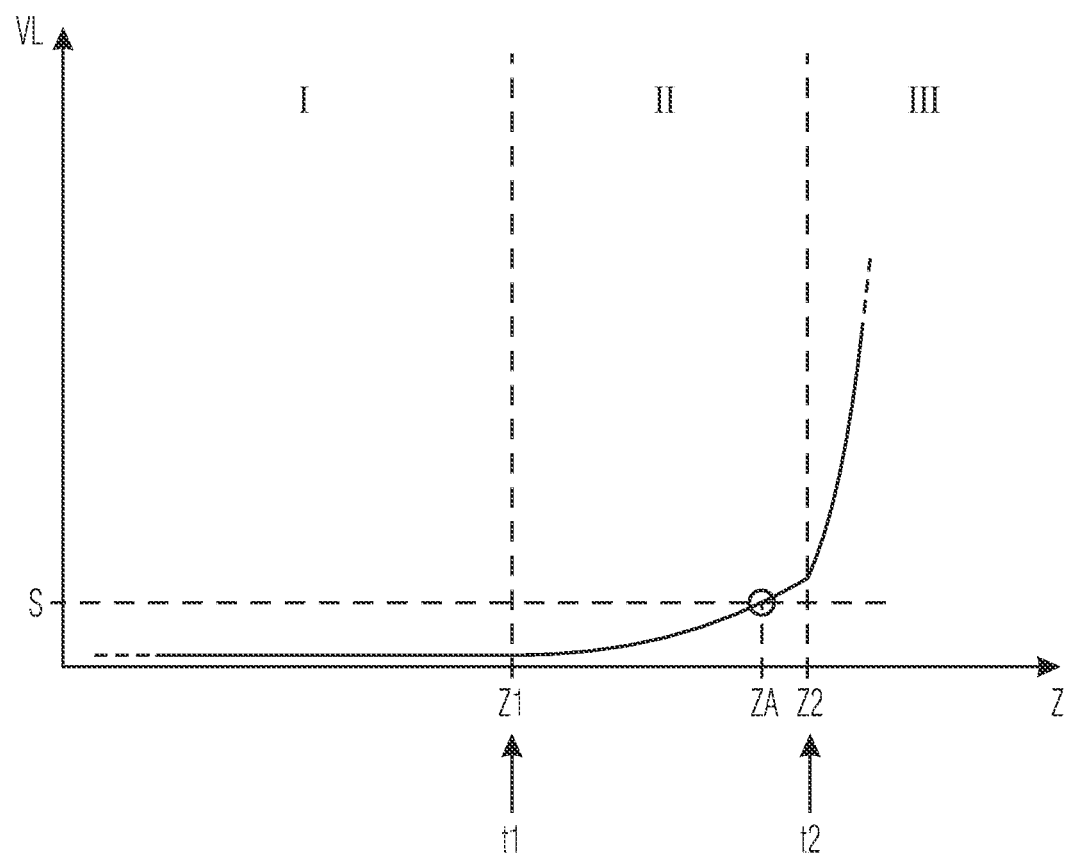
FIG. 5 is a signal diagram illustrating the displacement values VL in relation to the threshold value S.

A possible progression of the displacement values VL is illustrated in FIG. 5. This is schematic illustration of a progression, in which rotation-dependent fluctuations in the deflection of shaft 2 are not taken into account. Such a progression occurs, for example, if, as illustrated in FIG. 1, the motor spindle 10 is moved with the tool 4 toward the workpiece 6 in the direction of movement Z with an active coolant supply at a constant feed rate. For example, the determination of the displacement values VL is based on the position values P4, P5, P6 measured by the second group of position sensors 67, 68, 69, since the force F acts in the axis direction WZ.

If the approach takes place in the direction of movement X illustrated in FIG. 1, the determination of the displacement values VL may be based on the evaluation of the position values P1, P2, P3 measured by the first group of position sensors 64, 65, 66, since the forces resulting from the coolant supply predominantly cause a displacement of the shaft 2 perpendicular to the axis direction WZ.

Suitable combinations of position values P1, P2, P3, P4, P5, P6 of the position sensors 64, 65, 66, 67, 68, 69 may be utilized for determining the displacement values VL, depending on boundary conditions of the approach (e.g., direction of the approach, geometry of the workpiece, configuration of the internal cooling supply, etc.).

As illustrated in FIG. 5, the approach of the tool 4 to the workpiece 6 may be divided into three areas, an idling area I, an approach area II, and a machining area III. The approach takes place with an activated internal cooling supply.

In the idling area I (e.g., up to a position Z1, or a point in time t1), the coolant supply does not yet have any effect, therefore no, or only a negligibly small, substantially constant displacement of the shaft 2 occurs.

In the approach area II (e.g., between the position Z1 and a position Z2, or the time t1 and a time t2), there is an increase in the displacement of the shaft 2, the cause of which is a dynamic pressure that occurs when coolant 14 impinges on, or is deflected by, the workpiece 6. The force F acting on the tool 4 increases as the tool 4 further approaches to the workpiece 6.

In the machining area III (e.g., from position Z2, or time t2), contact occurs between the tool 4 and the workpiece 6 and thus machining takes place. For example, the force F and the forces occurring during machining of the workpiece 6 overlap, so that the progression of the displacement values VL has a jump in the transition between the approach area II and the machining area III. In other words, the impingement of the tool 4 on the workpiece 6 causes an abrupt increase in the progression of the displacement values VL.

Optionally, the displacement processor 41 may also calculate an angular position POS from the position values P1, P2, P3 and output it to the comparator 43 so that the direction of the deflection of the shaft 2 can be evaluated in addition to the magnitude. In addition, it may be provided to output the angle position POS to the control unit 100 via the output data channel 51, so that the angle measurement device 5 may be dispensed with, if necessary.

The displacement values VL are fed to the comparator 43. By comparing the displacement values VL arriving from the displacement processor 41 with a threshold value S, it forms an approach signal AS indicating whether the threshold value S has been reached, or exceeded, and outputs the approach signal AS to the control unit 100 via the output data channel 51.

The threshold value S is selected such that it is reached or exceeded in the approach area II, e.g., at an approach position ZA at which the tool 4 is close to the workpiece 6 without touching it, i.e., before the machining area III is reached. The threshold value S may be stored in the comparator 43 or supplied to the data processor 40 via the command channel 52.

The threshold value S may be determined in a test execution in which all three areas are traversed. Since this involves machining, a test workpiece may be used as workpiece 6.

For example, the data processor 40 may include a threshold determination device 42 adapted to determine the threshold value S. The displacement values VL are fed to device, as well as a test start command TEST, which is in turn fed to the data processor by the control unit 100 via the command channel 52. The threshold value determination device 42 is adapted to recognize from the progression or trend of the displacement values VL whether the tool 4 is in the idling area I, in the approach area II, or in the machining area III. For example, the threshold value determination device 42 detects the transition (e.g., jump) from the approach area II to the machining area III and, based on this transition, determines the approach position ZA and the associated displacement value VL as the threshold value S. After the threshold value S has been determined, the threshold value determination device 42 outputs a test stop signal STP via the output data channel 51 to the control unit 100, which may again immediately stop the movement of the tool 4 in the direction of the workpiece 6 (e.g., in the direction of movement Z) and thus the machining operation.

The sequences in the data processor 40 are controlled by the sequence control 44, to which the start command START, the test start command TEST, and, if necessary, parameters PAR are fed via the command channel 52. Control is achieved by control signals CTRL, which are output to the modules (e.g., displacement processor 41, threshold value determiner 42, comparator 43, etc.). The control signals CTRL may also include feedback signals from the modules to the sequence controller 44.

After the arrival of the start command START, the sequence control 44 initiates the following processes: continuous determination of displacement values VL from position values P1, P2, P3, P4, P5, P6 at constant time intervals in the displacement processor 41 and output of the displacement values VL to the comparator 43; and comparison of displacement values VL arriving from displacement processor 41 with threshold value S in comparator 43, and formation and output of approach signal AS therefrom.

Instead of the start command START, for example, switching on a supply voltage of the data processor 40 may also be utilized as a start command.

If no threshold value S is available, the following sequence for determining threshold values, which is started with the test start command TEST, may be performed in advance: continuous determination of displacement values VL from position values P1, P2, P3, P4, P5, P6 at constant time intervals in the displacement processor 41 and output of the displacement values VL to the threshold value determiner 42; formation of a threshold value S of the displacement of the shaft 2 in the threshold value determination device 42 by detecting the transition from the approach area II to the processing area III and determining, based on this transition, the approach position ZA and the associated displacement value VL as threshold value S; and output of the threshold value S to the comparator 43.

For example, the threshold value S is a constant value stored in the comparator 43.

The movement of the drives required to performed the described methods, the rotation of the shaft 2, the activation of the internal cooling supply, and the interaction with the data processor 40 may be controlled by a computer program, e.g., a set of instructions stored on or in a non-volatile, computer-readable storage medium, executed by the control unit 100.

As described above, the exact position of a new workpiece 6 to be machined, which is clamped in the working area of the motor spindle 10 by a clamping device, is still unknown. Only the rough position and orientation of the workpiece, which are predetermined by the clamping device, are known. The dimensions of the workpiece 6 (e.g., workpiece blank) are also known. Before machining the workpiece contour, it is necessary to determine the exact position of the workpiece 6. An exemplary method is described below with reference to the signal diagram of FIG. 5 in conjunction with the data processor 40 illustrated in FIG. 4.

In the starting position, the motor spindle 10 is at a position in idling area I. Initially, the control unit 100 controls the spindle motor 1 so that it rotates and activates the internal cooling supply. The control unit 100 signals the drives 20X, 20Y, 20Z, 20A, 20B required for the desired direction of movement to move the motor spindle 10 toward the workpiece 6 and sends the start command START to the data processor 40. The movement takes place at a constant feed rate.

The data processor 40 performs the sequence described in connection with FIG. 4, e.g., the displacement processor 41 continuously determines displacement values VL and the comparator 43 compares these with the threshold value S. If the progression of the displacement values VL reaches or exceeds the threshold value S, the approach signal AS is transmitted to the control unit 100.

After the approach signal AS arrives, the control unit 100 stores, as the position of the workpiece 6 at the selected approach point, the current position values of at least the position measuring devices 30X, 30Y, 30Z, 30A, 30B, which are influenced by the movement of the motor spindle by the drives 20X, 20Y, 20Z, 20A, 20B, and stops the drives, e.g., reverses the direction of movement, so that tool 4 and workpiece 6 move away from each other again until the motor spindle 10, or tool 4, is again in the idling area I.

For example, this sequence is carried out repeatedly at different positions of the workpiece 6 until a sufficient number of approach points (e.g., workpiece coordinates) are available to know the exact position of the workpiece 6, or the workpiece blank, and to be able to start the actual machining.

Alternatively, once an approach point is reached, the control unit 100 may also proceed directly to machining the workpiece 6. For this purpose, the feed rate may be adjusted, e.g., reduced.

If threshold values S are not yet available, for example, at the beginning of a series production, the control unit 100 may determine them using the method for determining threshold values.

Also, for example, the motor spindle 10 is initially at a position in idling area I. The control unit 100 controls the spindle motor 1 so that it rotates, and activates the internal cooling supply. The control unit 100 signals the drives 20X, 20Y, 20Z, 20A, 20B required for the desired direction of movement to move the motor spindle 10 toward the workpiece 6 and sends the test start command TEST to the data processor 40.

The data processor 40 executes the method for determining threshold values described in connection with FIG. 4, e.g., the displacement processor 41 continuously determines displacement values VL and feeds them to the threshold value determination device 42. This determines the current threshold value S from the progression of the displacement values VL and outputs it to the comparator 43. Then, the threshold determination device 42 transmits the test stop command STP to the control unit 100.

After the arrival of the test stop command STP, the control unit 100 stops the drives, or reverses the direction of movement, so that the tool 4 and the workpiece 6 move away from each other again until the motor spindle 10, or the tool 4, are in the idling area I again.

This sequence is also performed repeatedly at different positions of the workpiece 6 until threshold values S are available for a sufficient number of approach points (e.g., workpiece coordinates) to be able to determine the exact position of the workpiece 6, or the workpiece blank.

Figure 6:
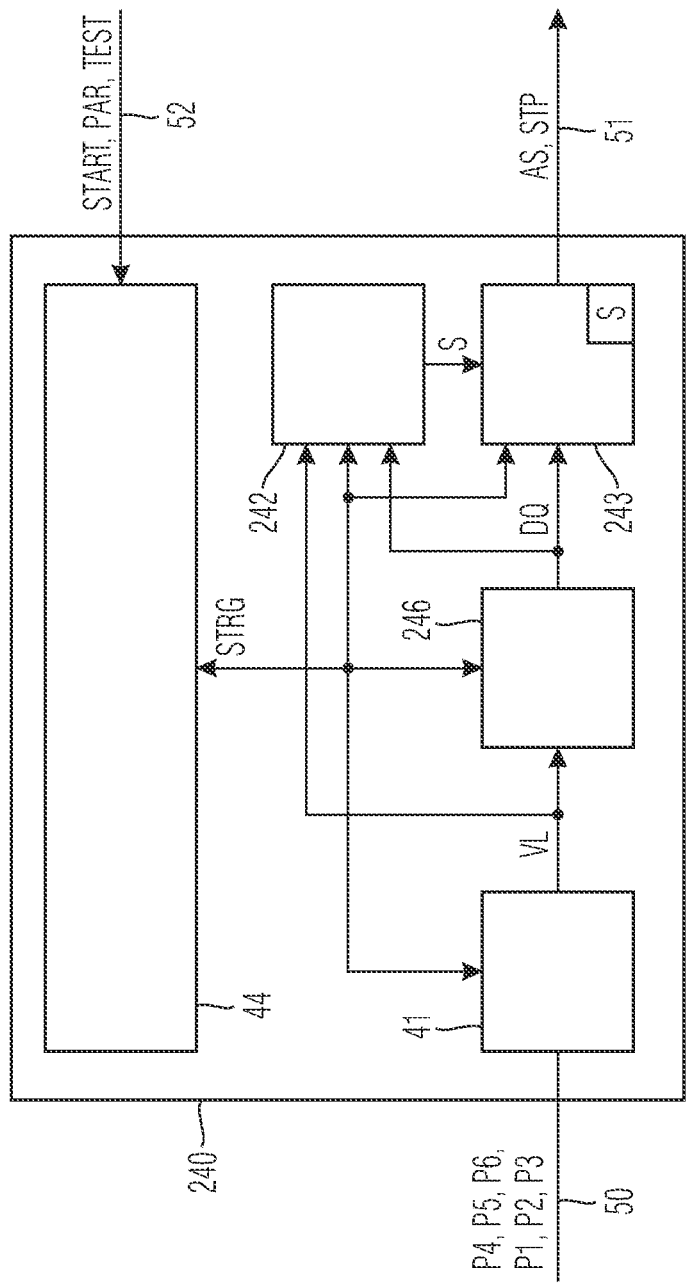
FIG. 6 illustrates a further data processor.

FIG. 6 illustrates an example of a data processor 240. It further includes the displacement processor 41 and sequence controller 44. The data processor 240 includes a differentiator 246 that differentiates the progression of the displacement values VL, for example, by calculating difference quotients DQ of successively arriving displacement values VL and the time interval of their arrival at the differentiator 246 and by outputting them to a comparator 243.

In turn, the comparator 243 compares arriving difference quotients DQ with a threshold value S stored in the comparator 243 in a memory provided for this purpose. If a difference quotient DQ exceeds the threshold value S, the comparator 243 signals this by outputting the approach signal AS.

Figure 7:
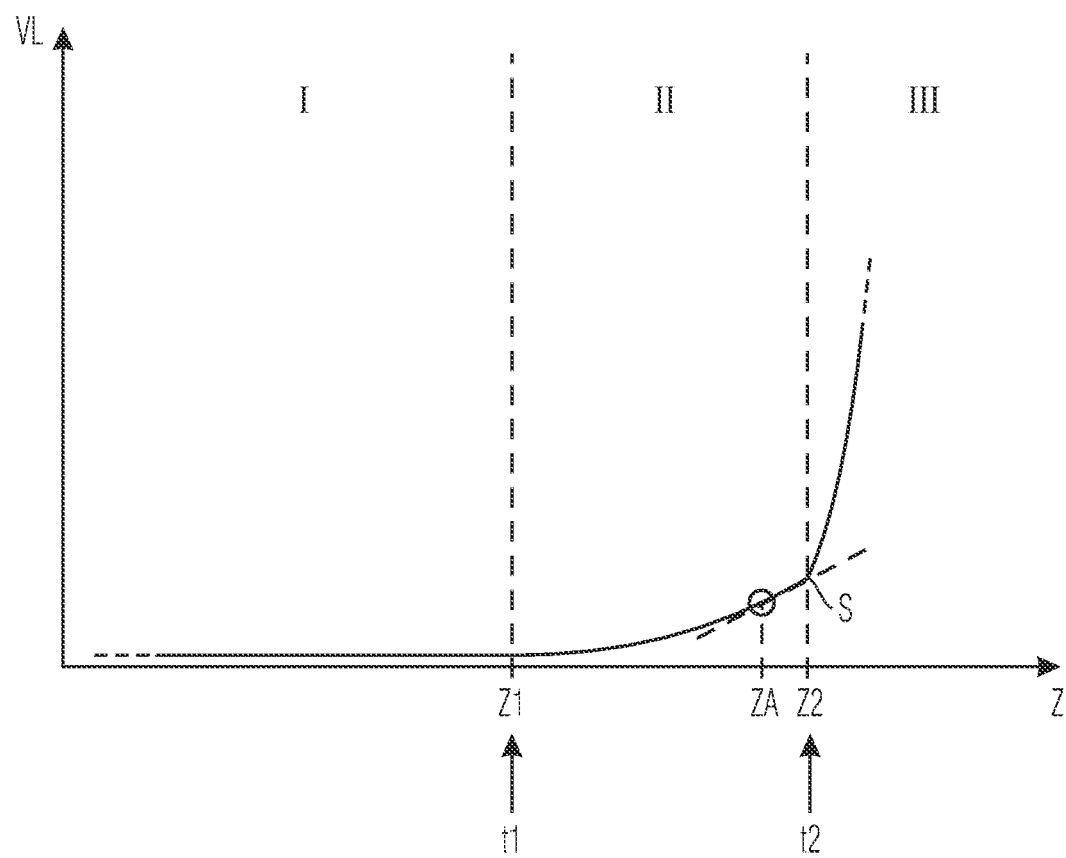
FIG. 7 is a signal diagram illustrating the displacement values VL in relation to the threshold value S.

FIG. 7 illustrates the displacement values VL in relation the threshold value S, which, in this example, indicates an incline of the progression of the displacement values VL (or a difference quotient DQ) at the approach position ZA.

Analogous to the data processor 40, the data processor 240 may comprise a threshold value determiner 242 to determine threshold values S in conjunction with the control unit 100. For this purpose, the displacement values VL and/or the difference quotients DQ are fed to the threshold value determination device 242. In each case, the graphs formed by the sequences of displacement values VL, or difference quotients DQ, have an abrupt increase as they move from the approach area II to the machining area III, which is detected by the threshold determination device 242. Starting from this position, the incline of the progression of the displacement values VL at the approach position ZA (e.g., the difference quotient) is determined as the threshold value S.

The control of the determination of threshold values S is performed by the test start command TEST and the test stop signal STP.

Thus, the data processor 240 can replace the data processor 40.

Figure 8:
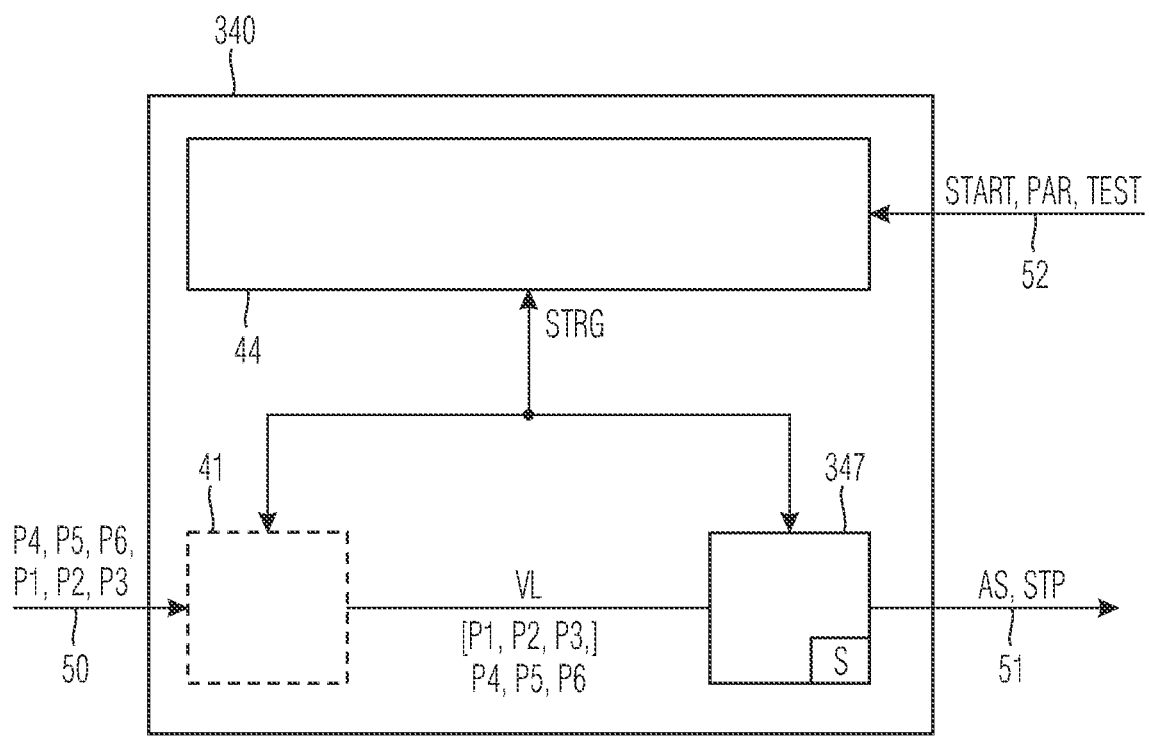
FIG. 8 illustrates another data processor.

FIG. 8 illustrates a further example of a data processor 340. It includes a frequency analyzer 347 in addition to the displacement processor 41 (e.g., optional in this example) and the sequence controller 44.

The frequency analyzer 347 is adapted to evaluate, in the frequency domain, the progression of displacement values VL arriving from the displacement processor 41. For example, mathematical methods, such as Fourier analysis (FFT, DET, Goertzel algorithm, etc.), order analysis, adaptive filtering, etc., may be used.

An evaluation of the displacement values VL in the frequency domain is considered particularly advantageous if a tool 4 is used in which the coolant 14 is discharged via corresponding openings (e.g., nozzles) in the lateral surface of the tool 4, for example, in the case of a milling cutter. If the tool 4 approaches the workpiece 6 while the shaft 2 is rotating, the coolant flow of each nozzle causes a rotational periodic deflection of the shaft 2. Thus, the approach between tool 4 and workpiece 6 can be detected by targeted monitoring of the power spectral density of frequency bands, which is dependent on the speed of the shaft 2 and the number of nozzles. The monitoring may be performed by comparison with threshold values S. The result of the evaluation may be output as approach signal AS.

A plurality of displacement values VL may be generated for each revolution of the shaft 2 in order to reliably detect the maxima of the deflection of the shaft 2 caused by the individual nozzles.

Optionally, the displacement processor 41 may be omitted, so that the position values P1, P2, P3 are fed directly to the frequency analyzer 347. This is based on the understanding that when the shaft 2 rotates, in sequences of position values P1, P2, P3, P4, P5, P6 of the position sensors 64, 65, 66, 67, 68, 69, which are measured at equal time intervals, deflections of the shaft 2 have an effect in the form of a variation of the position difference of successively measured position values. This variation of the position difference is detectable in the frequency spectrum.

The frequency analyzer 347 may also be adapted to determine threshold values S, e.g., based on determining the transition position from the approach area II to the machining area III.

The data processor 340 may thus also replace the data processor 40.

Figure 9:
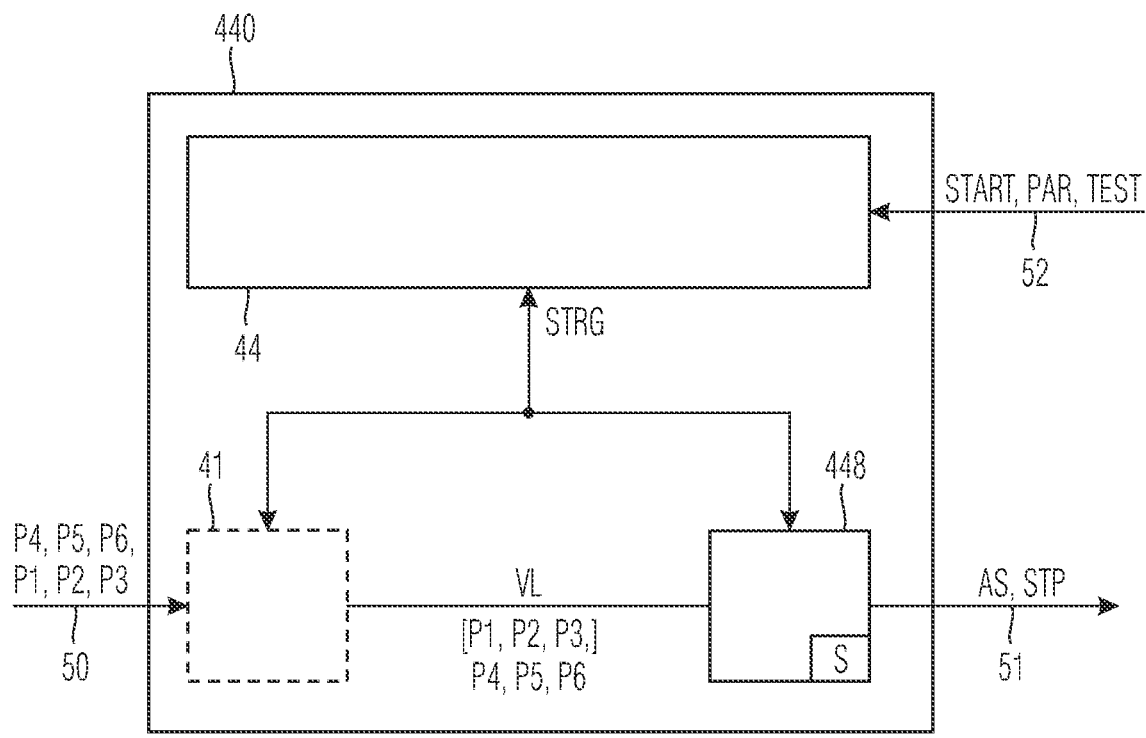
FIG. 9 illustrates yet a further data processor.

FIG. 9 illustrates a further example of a data processor 440. It includes an AI module 448, in addition to the (e.g., optional) displacement processor 41 and the sequence controller 44.

The AI module 448 is adapted to evaluate the progression of displacement values VL arriving from the displacement processor 41 with the use of artificial intelligence techniques, such as, for example, by comparison with predetermined patterns (e.g., machine learning), to detect the approach of the tool 4 to the workpiece 6. These patterns correspond to the threshold values S of the preceding examples and may be determined in connection with the control unit 100 in test executions. For example, the AI module is self-learning so that the detection of approach processes is continuously improved.

For example, the displacement processor 41 may be dispensed with, so that, as in the previous example, the position values P1, P2, P3, P4, P5, P6 are fed directly to the AI module 448 and their progression over time is evaluated.

If reaching the approach position ZA is detected, this is signaled with the approach signal AS.

The data processor 440 may replace the data processor 40.

What is claimed is:

1. A device for determining an approach of a tool to a workpiece in a machine tool, the tool and the workpiece being movable relative to one another and the tool or the workpiece being connected to a shaft in a rotationally fixed manner, the tool including a coolant channel adapted to supply a coolant to a machining area in which machining of the workpiece by the tool is performed, comprising:
  a measurement system, including a measuring graduation arranged in a rotationally fixed manner on the shaft and at least one position sensor arranged in a fixed manner relative to the shaft and adapted to scan the measuring graduation and to generate position values from the scanned measuring graduation that indicate a position of the shaft; and
  a data processor, the position sensor adapted to feed the position values to the data processor, the data processor adapted to determine that the tool approaches the workpiece by evaluation of a trend of the position values, to determine that the tool is located in an approach area relative to the workpiece, in which a displacement of the shaft, resulting from dynamic pressure of a coolant flow impinging on the workpiece, occurs, and to output an approach signal to signal that the tool reaches an approach position relative to the workpiece, in which the tool has approached the workpiece without touching the workpiece.

2. The device according to claim 1, wherein the measuring graduation includes a first graduation track having code elements arranged in a circumferential direction of the shaft.

3. The device according to claim 2, wherein the measuring graduation includes a second graduation track having code elements arranged in an annular manner around the circumference of the shaft.

4. The device according to claim 1, wherein the data processor includes a displacement processor adapted to determine, from the position values, displacement values that indicate a deflection of the shaft from a rest position.

5. The device according to claim 4, wherein the data processor includes a comparator adapted to determine the reaching of the approach position by comparing currently arriving displacement values with a threshold value.

6. The device according to claim 4, wherein the data processor includes a differentiator adapted to form the difference quotient of successively arriving displacement values, and a comparator adapted to determine the reaching of the approach position by comparing the difference quotients with a threshold value.

7. The device according to claim 4, wherein the data processor includes a frequency analyzer adapted to determine the reaching of the approach position by evaluating the trend of the displacement values in a frequency domain.

8. The device according to claim 4, wherein the data processor includes an AI module adapted to determine the reaching of the approach position by evaluating the trend of the displacement values by an artificial intelligence technique and/or by pattern recognition.

9. The device according to claim 1, wherein the data processor includes: a frequency analyzer adapted to determine the reaching of the approach position by evaluating the trend of the displacement values in a frequency domain; and/or an AI module adapted to determine the reaching of the approach position by evaluating the trend of the displacement values by artificial intelligence technique and/by pattern recognition.

10. The device according to claim 1, wherein the data processor includes a threshold value determination device adapted to detect, when the tool approaches the workpiece, a transition from the approach area to a machining area, in which machining of the workpiece is performed, and to determine a threshold value from the detected transition.

11. A method for determining an approach of a tool to a workpiece in a machine tool, the tool and the workpiece being movable relative to one another, the tool or the workpiece being connected to a shaft in a rotationally fixed manner, the tool having a coolant channel adapted to supply a coolant to a machining area in which machining of the workpiece by the tool is performed, the machine tool including a measurement device, having a measuring graduation arranged in a rotationally fixed manner on the shaft and at least one position sensor arranged in a fixed manner relative to the shaft, and a data processor, comprising:
- scanning the measuring graduation by the position sensor;
- generating, from the scanned measuring graduation, position values that indicate a position of the shaft;
- feeding the position values to the data processor;
- determining, by the data processor, that the tool is located in an approach area relative to the workpiece, in which a displacement of the shaft occurs as a result of dynamic pressure of a coolant flow impinging on the workpiece, by evaluating a trend of the position values as the tool approaches the workpiece; and
- outputting an approach signal, by the data processor, when the tool reaches an approach position relative to the workpiece, in which the tool has approached the workpiece without touching the workpiece.

12. The method according to claim 11, further comprising determining, by a displacement processor of the data processor, displacement values that indicate a deflection of the shaft from a rest position.

13. The method according to claim 12, wherein the reaching of the approach position is determined by a comparator of the data processor by comparing currently arriving displacement values with a threshold value.

14. The method according to claim 12, further comprising forming difference quotients of successively arriving displacement values by a differentiator of the data processor; wherein the reaching of the approach position is determined by a comparator of the data processor by comparing the difference quotients with a threshold value.

15. The method according to claim 12, wherein the reaching of the approach position is determined by a frequency analyzer of the data processor by evaluating the trend of the displacement values in a frequency domain.

16. The method according to claim 12, wherein the reaching of the approach position is determined by an AI module of the data processor by evaluating the trend of the displacement values by an artificial intelligence technique and/or by pattern recognition.

17. The method according to claim 11, wherein the reaching of the approach position is determined by: a frequency analyzer of the data processor by evaluating the trend of the displacement values in a frequency domain; and/or by an AI module of the data processor by evaluating the trend of the displacement values by an artificial intelligence technique and/or by pattern recognition.

18. The method according to claim 11, wherein the method is started by a start command fed to the data processor via a command channel.

19. The method according to claim 11, further comprising:
- detecting, by a threshold value determination device of the data processor, during a test execution, when the tool approaches the workpiece, a transition from the approach area to a machining area in which machining of the workpiece is performed; and
- determining, by the threshold value determination device, a threshold value from the transition.

20. The method according to claim 19, wherein the test execution is started by a test start command fed to the data processor via the command channel.

21. A machine tool, comprising:
- a tool movable relative to a workpiece and including a coolant channel adapted to supply a coolant to a machining area in which machining of the workpiece is performed by the tool;
- a rotatable shaft adapted to connect to the tool or the workpiece in a rotationally fixed manner;
- a device adapted determining an approach of the tool to the workpiece, including:
  - a measurement system, including a measuring graduation arranged in a rotationally fixed manner on the shaft and at least one position sensor arranged in a fixed manner relative to the shaft and adapted to scan the measuring graduation and to generate position values from the scanned measuring graduation that indicate a position of the shaft; and
  - a data processor, the position sensor adapted to feed the position values to the data processor, the data processor adapted to determine that the tool approaches the workpiece by evaluation of a trend of the position values, to determine that the tool is located in an approach area relative to the workpiece, in which a displacement of the shaft, resulting from dynamic pressure of a coolant flow impinging on the workpiece, occurs, and to output an approach signal to signal that the tool reaches an approach position relative to the workpiece, in which the tool has approached the workpiece without touching the workpiece.

* * * * *